(12) United States Patent
McLean et al.

(10) Patent No.: US 7,195,652 B2
(45) Date of Patent: Mar. 27, 2007

(54) METHOD FOR FORMING COMPACT CHEMICAL REACTORS WITH REACTOR FRAMES

(75) Inventors: Gerard Francis McLean, West Vancouver (CA); Duhane Lam, Vancouver (CA); Olen Vanderleeden, Coquitlam (CA)

(73) Assignee: Angstrom Power, North Vancouver (CA)

( * ) Notice: Subject to any disclaimer, the term of this patent is extended or adjusted under 35 U.S.C. 154(b) by 0 days.

(21) Appl. No.: 10/818,612

(22) Filed: Apr. 6, 2004

(65) Prior Publication Data
US 2005/0221156 A1    Oct. 6, 2005

(51) Int. Cl.
*H01M 6/00*    (2006.01)
(52) U.S. Cl. ............... 29/623.1; 29/623.5; 427/115; 429/38; 429/39
(58) Field of Classification Search ........... 29/623.1, 29/623.5; 429/38, 39; 427/115
See application file for complete search history.

(56) References Cited

U.S. PATENT DOCUMENTS

| | | | |
|---|---|---|---|
| 3,634,140 A | 1/1972 | Von Krusenstierna | 136/86 B |
| 5,252,410 A | 10/1993 | Wilkinson | 429/33 |
| 5,350,642 A * | 9/1994 | Akagi | 429/32 |
| 5,364,711 A | 11/1994 | Yamada | 429/15 |
| 5,480,738 A | 1/1996 | Elangovan | 429/32 |
| 5,631,099 A | 5/1997 | Hockaday | 429/30 |
| 5,672,439 A | 9/1997 | Wilkinson | 429/40 |
| 5,759,712 A | 6/1998 | Hockaday | 429/30 |
| 5,861,221 A | 1/1999 | Ledjeff | 429/32 |
| 5,925,477 A | 7/1999 | Ledjeff | 429/32 |
| 5,989,741 A | 11/1999 | Bloomfield | 429/32 |
| 6,060,188 A | 5/2000 | Muthuswamy | 429/31 |
| 6,127,058 A | 10/2000 | Pratt | 429/30 |
| 6,620,542 B2 | 9/2003 | Pan | 429/41 |

(Continued)

FOREIGN PATENT DOCUMENTS

CA    2 273 316    11/1999

(Continued)

OTHER PUBLICATIONS

Wainwright, et al. "A Microfabricated Hydrogen/Air Fuel Cell" 195 Meeting of the Electrochemical Society, Seattle, WA, 1999.

*Primary Examiner*—Patrick Joseph Ryan
*Assistant Examiner*—Julian Mercado
(74) *Attorney, Agent, or Firm*—Wendy Buskop; Buskop Law Group, P.C.

(57) ABSTRACT

The invention relates to a method making a compact chemical reactor with high aspect ratio cavities comprising the steps: forming at least one intermediate assembly, consisting of: at least one frame comprising: a process layer, a perimeter barrier and at least one low aspect ratio cavity; at least one frame comprising: a process layer, two perimeter barriers, and at least two low aspect ratio cavities disposed on a second process layer; at least one layer comprising a perimeter barrier formed on one side of a process layer with at least one low aspect ratio cavity; or combinations of (i) and (iii) joined together; joining at least two intermediate assemblies together to create a compact chemical reactor with at least one high aspect ratio cavity; and joining the compact chemical reactor with at least one high aspect ratio cavity to two reactant plenums to facilitate a transport process between the reactant plenums and the process layers.

29 Claims, 9 Drawing Sheets

U.S. PATENT DOCUMENTS

| | | | |
|---|---|---|---|
| 6,740,444 B2 | 5/2004 | Leban | 429/41 |
| 6,830,736 B1 | 12/2004 | Lamla | 422/211 |

FOREIGN PATENT DOCUMENTS

| | | |
|---|---|---|
| CA | 2 396 191 | 9/2001 |
| CA | 2 438 733 | 8/2002 |
| CA | 2 484 294 | 11/2003 |
| EP | 0585049 | 8/1993 |
| EP | 0 823 743 | 7/1997 |
| EP | 0823743 | 8/1997 |
| GB | 2339058 | 1/2000 |
| JP | 8050903 | 2/1996 |
| WO | PCT/US01/11763 | 12/2001 |
| WO | PCT/US02/00063 | 1/2002 |
| WO | PCT/US02/17434 | 6/2002 |

* cited by examiner

METHOD FOR FORMING COMPACT CHEMICAL REACTORS WITH REACTOR FRAMES

FIELD

The present embodiments relate to methods of making compact chemical reactors with frames and fuel cells with frames.

BACKGROUND

Layered planar fuel cells and chemical reactors are difficult to manufacture. One major problem with the layered planar chemical reactor is that the layers must be held in intimate electrical contact with each other, which, if the intimate contact does not occur the internal resistance of the stack increases, decreasing the overall efficiency of the chemical reactor.

A second problem with the layered planar chemical reactor has been that with larger surface areas. It is difficult to maintain consistent contact with the inner recesses of the layered planar structured chemical reactor.

Existing devices also have the feature that with the layered planar chemical reactor since both reactants are required to flow within the plane of the layered planar structured chemical reactor, at least 4 and up to 6 distinct layers have been required to form a workable cell. These layers are usually manufactured into two separate chemical reactors components and then a chemical reactor stack is formed by bringing layers into contact with each other. When contacting the layers, care must be taken to allow gas diffusion within the layers while preventing gas from leaking from the assembled chemical reactor stack.

A need has existed for a micro or small chemical reactors having high volumetric power density.

A need has existed for a method for making a compact chemical reactor with a low cost manufacturing technique.

A need has existed for a method for making a micro chemical reactor having the ability to utilize a wide variety of electrolytes.

A need has existed for a method to make a micro chemical reactor, which has the ability to scale to higher power.

A need has existed for a method of making a compact chemical reactor capable of being connected together without the need for external components for connecting the chemical reactors together.

A need has existed for a method of making a compact fuel cell with high aspect ratio cavities. The aspect ratio of the fuel cell is defined as the ratio of the fuel cell cavity height to the width. Increasing this ratio is beneficial for increasing the efficiency of the fuel cell.

A need has existed to develop chemical reactor topologies or chemical reactor architectures that allow increased active areas to be included in the same volume, i.e. higher density of active areas. This will allow chemical reactors to be optimized in a manner different than from those being pursued by most chemical reactor developers today.

The present invention meets these needs.

SUMMARY

A method making a compact chemical reactor with high aspect ratio cavities comprising the steps of: forming at least one intermediate assembly, consisting of: at least one frame comprising: a process layer, a perimeter barrier and at least one low aspect ratio cavity; at least one frame comprising: a process layer, two perimeter barriers, and at least two low aspect ratio cavities disposed on a second process layer; at least one layer comprising a perimeter barrier formed on one side of a process layer with at least one low aspect ratio cavity; or combinations of (i) and (iii) joined together; joining at least two intermediate assemblies to together to create a compact chemical reactor with at least one high aspect ratio cavity; and joining the compact chemical reactor with at least one high aspect ratio cavity to two reactant plenums to facilitate a transport process between the reactant plenums and the process layers.

BRIEF DESCRIPTION OF THE DRAWINGS

In the detailed description of the preferred embodiments presented below, reference is made to the accompanying drawings, in which.

The present embodiments are detailed below with reference to the listed figures.

DETAILED DESCRIPTION OF THE PREFERRED EMBODIMENTS

Before explaining the present embodiments in detail, it is to be understood that the embodiments are not limited to the particular descriptions and that it can be practiced or carried out in various ways.

The method was devised to create fuel cell layers and compact chemical reactors with frames. The present invention also provides a method to build a device which can be scaled to micro-dimensions, so that very small micro-reactors can be created.

The method creates fuel cells with frames and compact chemical reactors with frames which enable users to scale up the compact chemical reactor to larger sizes without the need for external components to hold the compact chemical reactor together.

The use of frames in the compact chemical reactor simplifies the method of assembly by reducing the number of components needed in construction. The use of frames to build compact chemical reactors improves the precision in alignment between the process layers and the perimeter barriers that are used in the fuel cell layers of the invention.

When composites frames are used, the frame-based design simplifies the task of sealing layers by only having to bond similar materials to each other.

Figure 1:
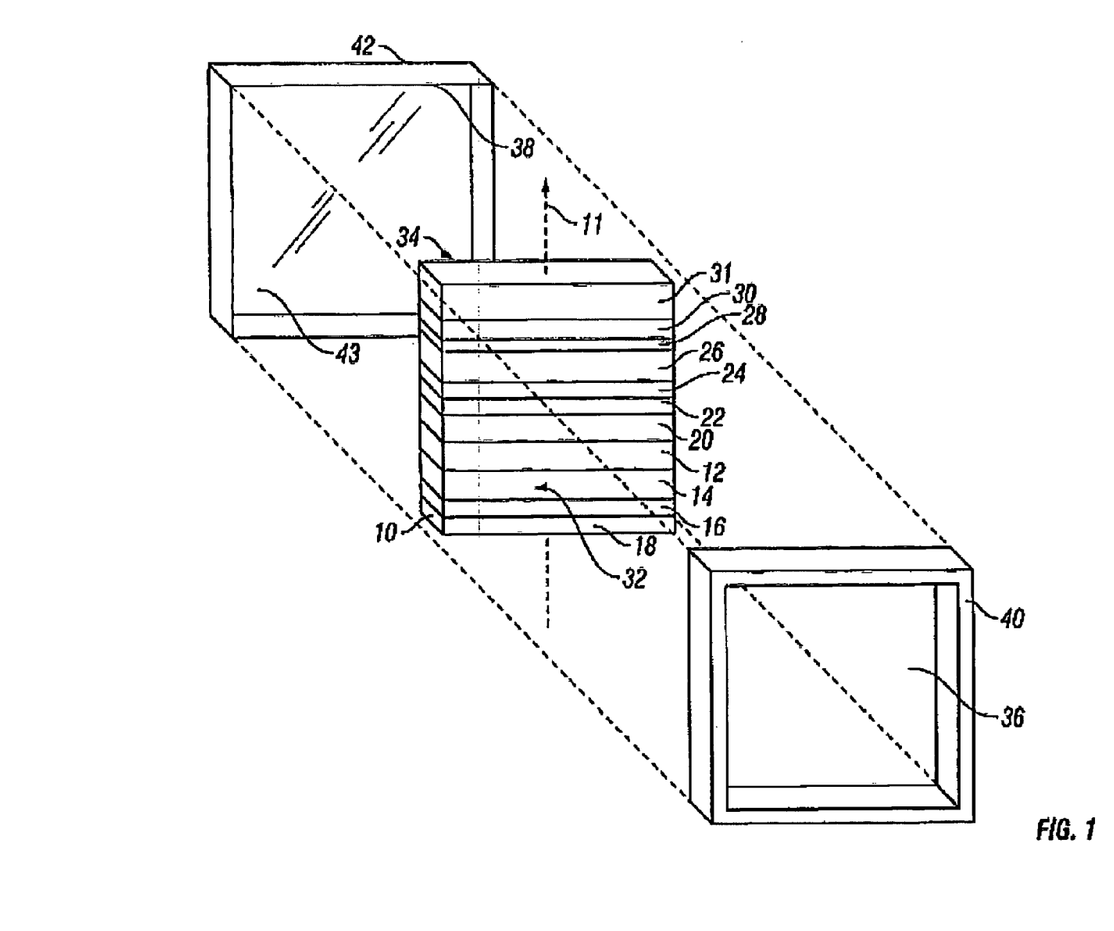
FIG. 1 depicts a front perspective view of a thin flat construction of the compact chemical reactor with frames.

With reference to the figures, FIG. 1 is a front perspective view of a compact chemical reactor (10) with a central axis (11) which is improved by using the methods of this invention. FIG. 1 depicts a thin flat construction embodiment of a compact chemical reactor or fuel cell layer with frames made by the method.

Figure 2:
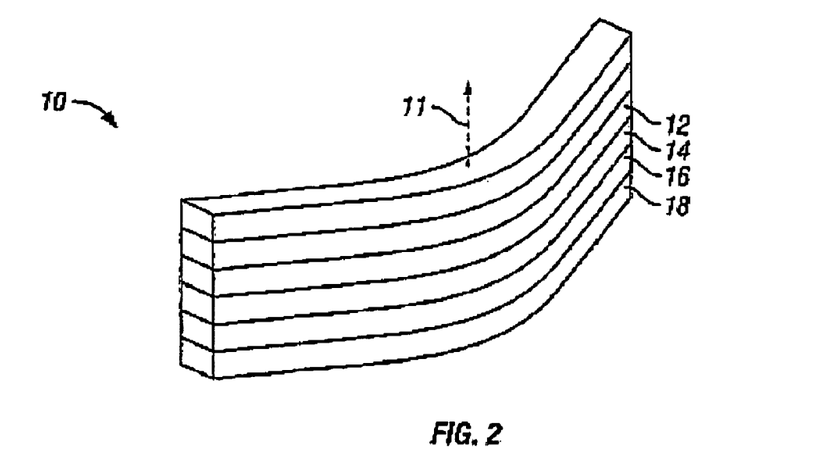
FIG. 2 depicts a curvilinear compact chemical reactor with frames.

FIG. 2 depicts a thin curvilinear embodiment of a compact chemical reactor (10) or fuel cell layer with frames made by the method. Various shapes of fuel cell layers are improved with this method.

The method involves making a compact chemical reactor with frames and with high aspect ratio cavities using the steps:
a. forming at least one intermediate assembly, consisting of at least one of:
  i. at least one frame comprising: a process layer, a perimeter barrier and at least one low aspect ratio cavity;
  ii. at least one frame comprising: a process layer, two perimeter barriers, and at least two low aspect ratio cavities disposed on a second process layer;
  iii. at least one layer comprising a perimeter barrier formed on one side of a process layer with at least one low aspect ratio cavity; or
  iv. combinations of (i) and (iii) joined together;
b. joining at least two intermediate assemblies to together to create a compact chemical reactor with at least one high aspect ratio cavity; and
c. joining the compact chemical reactor with at least one high aspect ratio cavity to two reactant plenums to facilitate a transport process between the reactant plenums and the process layers.

The resultant compact chemical reactor with frames, which can be a fuel cell layer with frames, is contemplated to be a thin flat compact chemical reactor, with an overall dimension which is between 1 centimeter and 100 centimeters in length, between 5 millimeters and 50 centimeters in width, and about 100 nanometers to 5 centimeters in thickness.

FIG. 1 shows a compact chemical reactor with frames made by the method with 11 unit reactors formed from intermediate assemblies connected together. The unit reactors can be unit fuel cells if the method is making a fuel cell layer. The method makes at least a two unit reactor layer of (12) and (14). Nine other unit reactors are also shown (16, 18, 20, 22, 24, 26, 28, 30 and 31).

The first and second unit reactors are disposed adjacent each other, a front side (31) and a back side (32) are formed. The front side (31) communicates with the front reactant plenum (36), which can hold oxidant in the fuel cell layer version. The back reactant plenum (38) can hold fuel.

Figure 3:
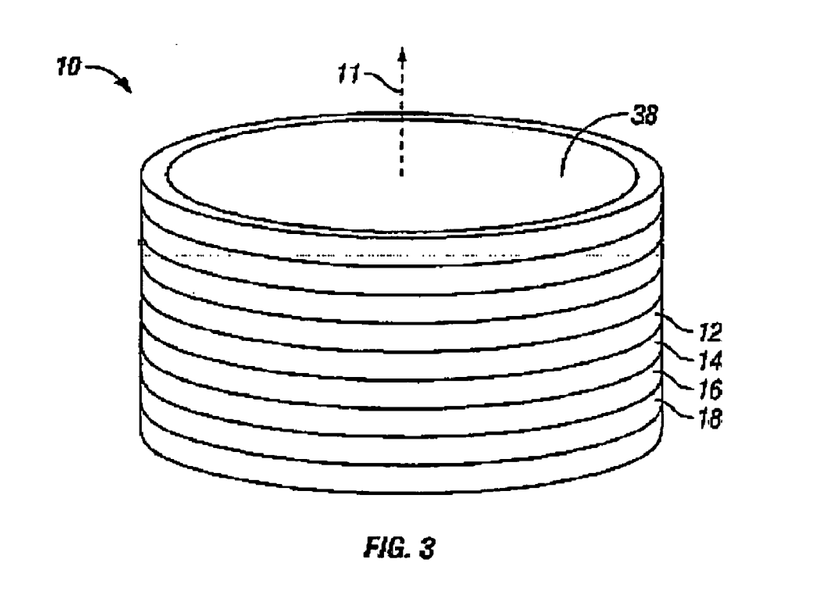
FIG. 3 depicts an embodiment where the unit reactors are perpendicular to the axis of the compact chemical reactor with frames.

FIG. 2 is a curvilinear version of the compact chemical reactor (10). FIG. 3 shows a cylindrical version of a compact chemical reactor made according to the invention, having an overall diameter between 1 centimeter and 5 centimeters and a height of between 1 millimeter and 80 millimeters and a thickness between 0.5 millimeters and 5 millimeters. Other shapes besides a cylindrical shape can be used. As an alternative to embodiments depicted in FIG. 1, FIG. 2, and FIG. 3, the compact chemical reactor (10) can be a cylinder, a prismatic shape, a boxlike construction or an irregular three dimensional shape.

Figure 4:
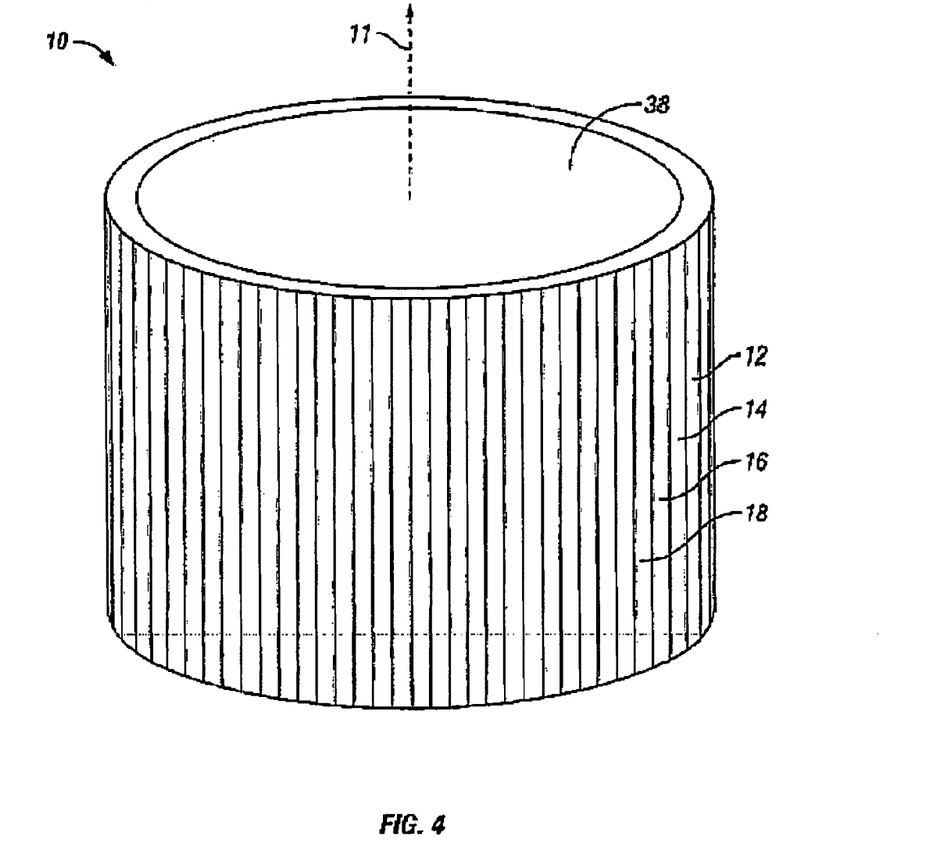
FIG. 4 depicts an embodiment where the unit reactors are parallel to the axis of the compact chemical reactor.

FIG. 4 shows still another compact chemical reactor made by the method. The compact chemical reactor (10) can have a variable thickness; variable thickness can mean that one individual unit reactor can be thicker than an adjacent unit reactor.

Figure 5:
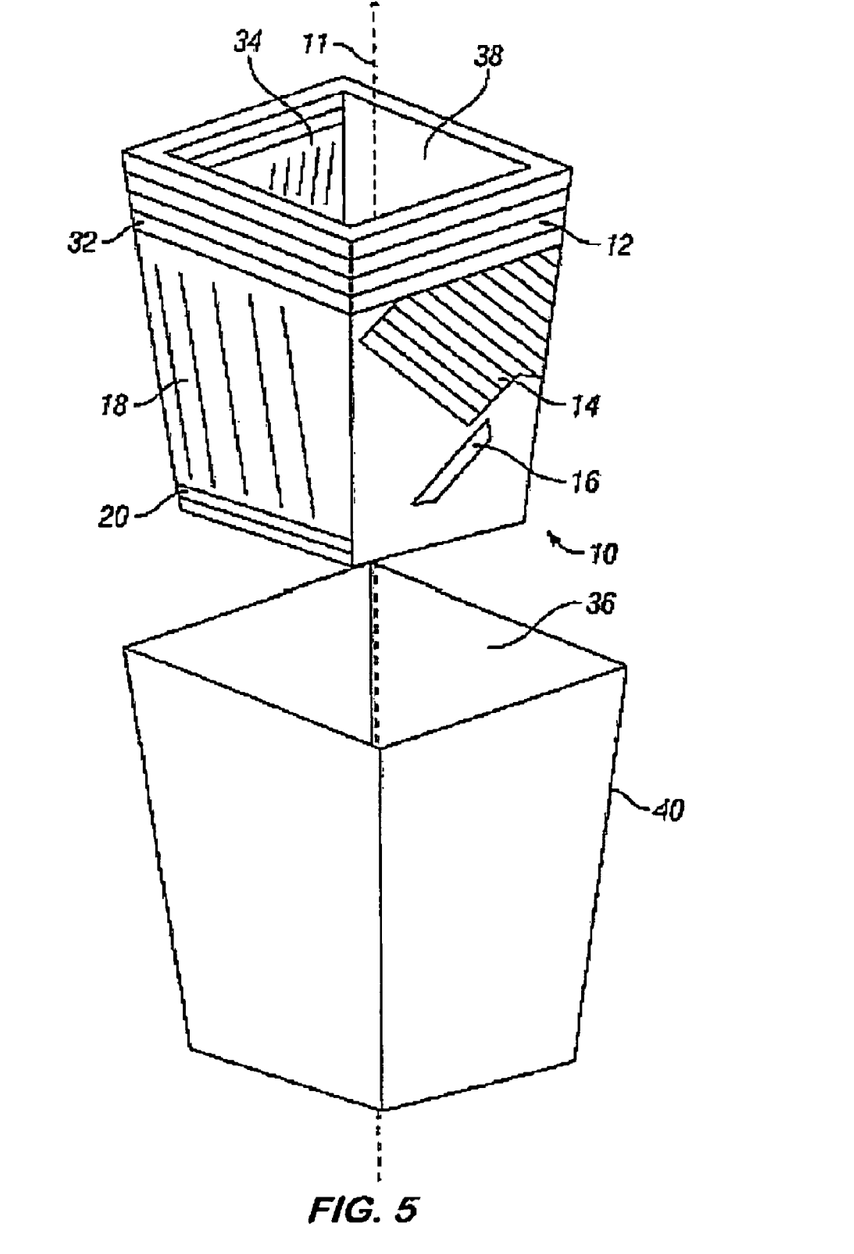
FIG. 5 depicts fuel cells at arbitrary angles to each other and the chemical reactor having an irregular three dimensional shape.

FIG. 5 shows a front reactant plenum (36) and a back reactant plenum (38). The front reactant plenum (36) is enclosed by a structure (40). The structure can either be a closed container or open to ambient atmosphere. FIG. 5 depicts an embodiment of the structure (40) being closed. When the front reactant plenum is open to the atmosphere the enclosing structure (40) is optional. The structure (40) when open to the atmosphere, adds structural support to the front reactant plenum.

The back reactant plenum (38) is enclosed by a device (42) which is similar to structure (40). The device (42) can be a closed container or open to ambient atmosphere. When the device (42) is open to the atmosphere, it adds structural support to the back reactant plenum.

Figure 6:
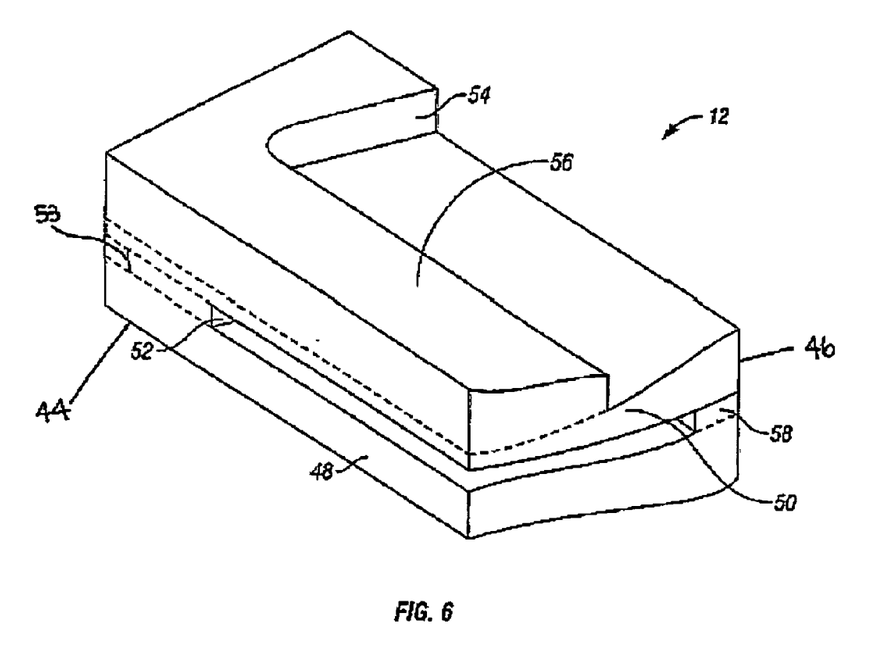
FIG. 6 depicts an exploded perspective view of a compact chemical reactor constructed from two frames.

FIG. 6 shows a portion of the compact chemical reactor made according to the invention. In this embodiment, a portion of the compact chemical reactor has a first process layer (48) and a second process layer (50). The process layers (48 and 50) are shown in this embodiment as thin sheets with each process layer having, preferably, a thickness between one nanometer and two centimeters.

As an alternative, the one or more of the process layers can have a thickness different from another process layer. It is contemplated that the process layers may not be thin sheets. It is also contemplated that the thin sheets can be made from one of a variety of materials. For example, process layer material could be an electrolyte, an ion exchange membrane, a filtration membrane, a separation membrane, a micro-structured diffusion mixer, a heater, a catalyst, electrical conductors, thermal conductors, and combinations of these. For example, a workable ion exchange membrane would be Nafion™ available from E.I. DuPont DeNamours of Wilmington, Del. A usable separation membrane could be Nafion as well using different reactants from the reactants used for the ion exchange reactor. A micro-structured diffusion mixer is available from Micronics of Seattle, Wash., and typically serves to allow transport of liquid from one cavity to another by diffusion without use of a separation membrane. They have small channels, and when liquid is pushed through the channels, there is a laminar flow. Typically they are used for blood testing, to prevent the mixing of blood with the test liquid but permit diffusion from one liquid to another. A heater that would be usable in the invention would be a thin film resistive heater, such as those available from Omega of Stamford, Conn. Catalysts which are contemplated as useable include inorganic carbon catalysts, such as Novacarb™ from Mast Carbon of the United Kingdom. An electrical conductor which is contemplated for use in the invention would be a thin film of metal, such as copper or a silver filled epoxy such as model number TF12202 from Tech Film from Peabody, Mass. Thermal conductors usable in the invention can be metals, such as thermally conductive epoxy adhesive films such as those also available from Tech Film.

Alternatively, each process layer can be made of a filled metal composite, a filled micro-structure of polymer, filled epoxy composite, graphite composite, or combinations of these materials. Examples of filled metal composites would be a stainless steel filled with carbon, such as those available from Angstrom Power Inc. of Vancouver, Canada. Filled micro-structures of polymers include Primea™ membrane available from Gore Industries of Elkton, Md. Filled epoxy composites include those available from Tech Film of Peabody, Mass. Graphite composites include Grafoil™ available from Graftek from Wilmington, Del.

It is also contemplated that the compact chemical reactor can have a first process layer that performs a different process from the second process layer, for example, the first process layer can be an electrolyte and the second process layer can be an electrical conductor in the example where the compact chemical reactor is a fuel cell or electrolyzer.

Figure 7:
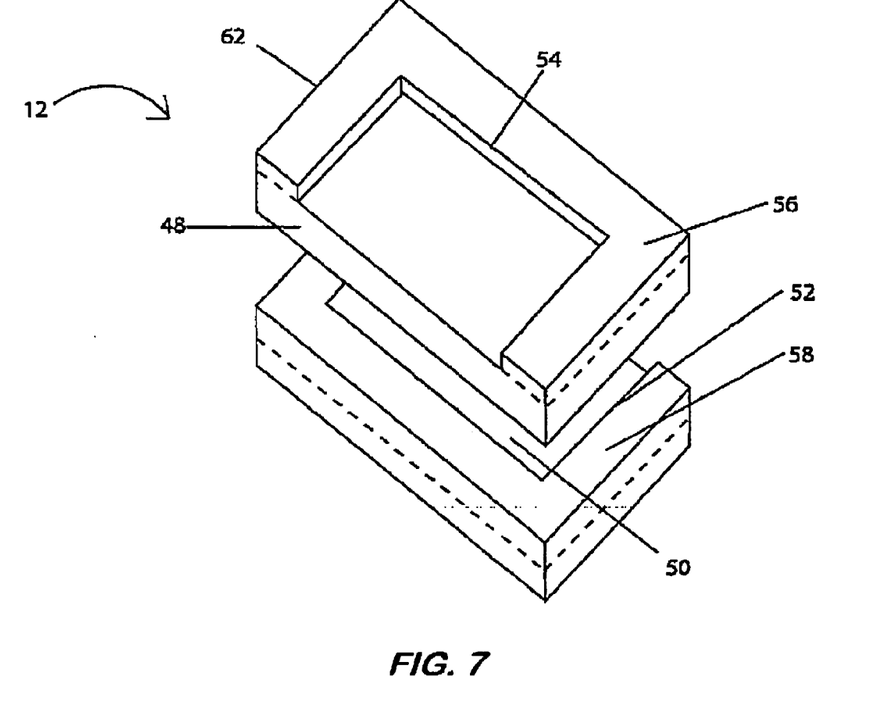
FIG. 7 depicts a view of an intermediate assembly of the invention.

FIG 7 depicts a view of an intermediate assembly of the compact chemical reactor which is made with a front low aspect ratio cavity (52) and a back low aspect ratio cavity (54). The low aspect ratio cavity (52) has a height of(53). The low aspect ratio cavities (52 and 54) are formed between the first and second process layers (48 and 50). The portion of the reactor includes a front perimeter barrier (56) and a back perimeter barrier (58). The front perimeter barrier (56) is located on the second process layer (50) substantially surrounding the back high aspect ratio cavity (54). The front perimeter barrier (56) can optionally completely enclose the back high aspect ratio cavity (54). Likewise, the back perimeter barrier (58) is located on the first process layer (48) substantially surrounding the front low aspect ratio cavity (52). The back perimeter barrier (58) can optionally completely enclose the front low aspect ratio cavity (52).

The formation of low aspect ratio cavities in the intermediate assemblies greatly simplifies the task of inserting active materials into the cavities to facilitate transport processes required by the chemical reactor. Manipulating and filling low aspect ratio cavities where the depth of the cavity is small in comparison to either the length or width of the cavity is easily done with a variety of commonly available methods for filling and deposition. In operation, though, when intermediate assemblies made from frames are place adjacent each other to create the compact chemical reactor the cavities present a narrow opening to the adjacent reactant plenum so that in operation the intermediate assemblies combine to form overall high aspect ratio cavities.

The perimeter barriers ensure that reactant from one reactant plenum which connects to one of the cavities, does not migrate into another reactant plenum which connects to the other cavity. For example, when the compact chemical reactor functions with fuel cells as the unit reactors, with oxidant in one of the reactant plenums and fuel in the other reactant plenum, the perimeter barriers prevent the uncontrolled mixing of fuel and oxidant.

The perimeter barriers keep the reactant from migrating by the material and/or the form of the perimeter barriers. Usable materials for the perimeter barriers include metal, such as stainless steel, silicone such as RTV™ available from Dow Coming of Midland, Mich.; a rubber in the form of seals such as those available from the Apple Rubber Products Incorporated of Lancaster, N.Y.; a polyamide, such as nylon, a nylon 6 or a nylon 6,6 available from DuPont; synthetic rubber such as BUNA, available from Dow; Synthetic Rubber of Edegem Belgium; epoxy such as those available from EPO Tech of Billerica, Mass.; polytetrafluoroethylene also available as Teflon™ from various sources; polyvinyldiflouride, known as Kynar™, available from Atofina Chemicals; composites thereof, laminates thereof, alloys thereof, and blends of these materials.

Usable forms for the perimeter barriers include microstructures or three-dimensional structures that create a tortuous path for the reactant. In some cases, the perimeter barriers can employ both the use of materials and use of a structural form to prevent the migration of the reactant to another reactant plenum.

With this method, one or more of the cavities can be filled partially or completely filled with a material to aid in the transport of reactant, by- product of the reaction caused by the reactants, or transport of attributes of reactant. A porous media, such as those available from Angstrom Power Inc. of Vancouver, Canada can be used to partially or completely fill the cavities. In a preferred embodiment, the low aspect ratio cavity is filled 100% with the porous media although the low aspect ratio cavity can be filled as little as 5% with the porous media.

Examples of reactants usable in this invention include fuels, oxidants, beverages, liquid phase hydrocarbons, gas phase hydrocarbons, foodstuffs, by-products of the reaction and combinations of these. Hydrogen is a typical fuel reactant when coupled with oxygen as the oxidant. Beverages which could be used as reactants include wine, juices, and other liquids with particulate. Liquid phase hydrocarbons which can serve as reactants include methanol, ethanol, butanol, and formic acid. Gas phase hydrocarbons include propane, butane, methane, and combinations of these. Foodstuffs include whey of cheese products, chocolates based liquids, and other foods stuffs which are initially liquid and then solidify.

The invention results in a transport process that moves an attribute of one of the reactants from one of the reactant plenums to the other reactant plenum.

Attributes within the scope of this application are the attributes of the reactant and include ionic charge (when used as a fuel cell) heat (when used as a heat exchanger), moisture content (when used as a humidifier), pressure (when used with a gas permeable membrane to allow gas to diffuse out of a liquid), concentration (when used to transport material from a substance having a first concentration to a substance with a different concentration), electrical charge, and other similar physical characteristics. For example, the chemical reactor can move large amounts of heat from a first reactant plenum to a second reactant plenum. If this reactor is made as a heat exchanger having hot water at 90 degrees Celsius on one side and cold water at 20 degrees Celsius on the other side, the reactor can quickly perform a thermal transfer of hot into cold in short time.

The compact chemical reactor assembled according to the present invention provides high surface area process layers which are in communication with the reactant plenums through the front or back cavities. The front or back cavities have high aspect ratios, wherein the distance from the front or back face to the opposite side of the cavity is much larger than the height of the front or back perimeter barrier.

The reactor preferably is made wherein the aspect ratio of at least one high aspect ratio cavity is >1 cm/cm, more preferably is between 1 cm/cm and 100 cm/cm and most preferably is between 2.5 cm/cm and 15 cm/cm.

In operation, reactants move from the reactant plenums into the front or back high aspect ratio cavities of the compact chemical reactor to come into contact with the process layers.

In a preferred embodiment the reactants move in and out of the high aspect ratio cavities through diffusion.

In still another alternative embodiment, the reactant transport into and out of the high aspect ratio cavities is aided by forced convection or by the forced flow through a microstructure embedded within at least one of the front or back high aspect ratio cavities.

Each compact chemical reactor or fuel cell layer is made from intermediate assemblies. Referring to FIG. 7, each intermediate assembly can be made from one or more reactor frames (62). The frames can be made of a material that enables the frames to function as both a perimeter barrier and as a process layer.

The frames are made from a material by stamping, embossing, ablating, machining, molding, casting, water jetting, or otherwise gouging, or chemically etching a substrate. Typical materials can be stainless steel, Nafion™, a composite, a metal filled composite, electrolyte filled composites, or combination of these materials. The frames can selectively be porous for use within the scope of this invention.

In the case of a compact chemical reactor which is a fuel cell, two types of frames can be used on the fuel cell, an electronically conducting frame and an ionically conducting frame. The electronically conducting frame is preferably made from an electronically conducting material or alternatively, is made conductive by filling a porous region with a nonporous conductive material. The ionically conductive frame is preferably made from an ionic conductor, such as Nafion™ from DuPont. If Nafion™ is used, then the perimeter barrier is also formed from Nafion™.

Alternatively, the frame material can be made from electrically insulating material such as polyethylene with a porous region that has been filed with Nafion™ to render the region ionically conductive. The frames can be made of identical materials or the frame can each have a different material.

The frames are typically one-piece structures to advantageously reduce the number of parts. The one piece construction also simplifies the alignment of a fuel cell or other compact chemical reactor which makes the process for making fuel cells cheaper and quicker than layered materials. By using a one-piece formed construction of frames, there is no need for the extra step of bonding dissimilar materials together as perimeter barrier material or process layer. Thus a fuel cell or similar compact chemical reactor will have better integrity and less maintenance issues than multipart constructions.

Figure 9:
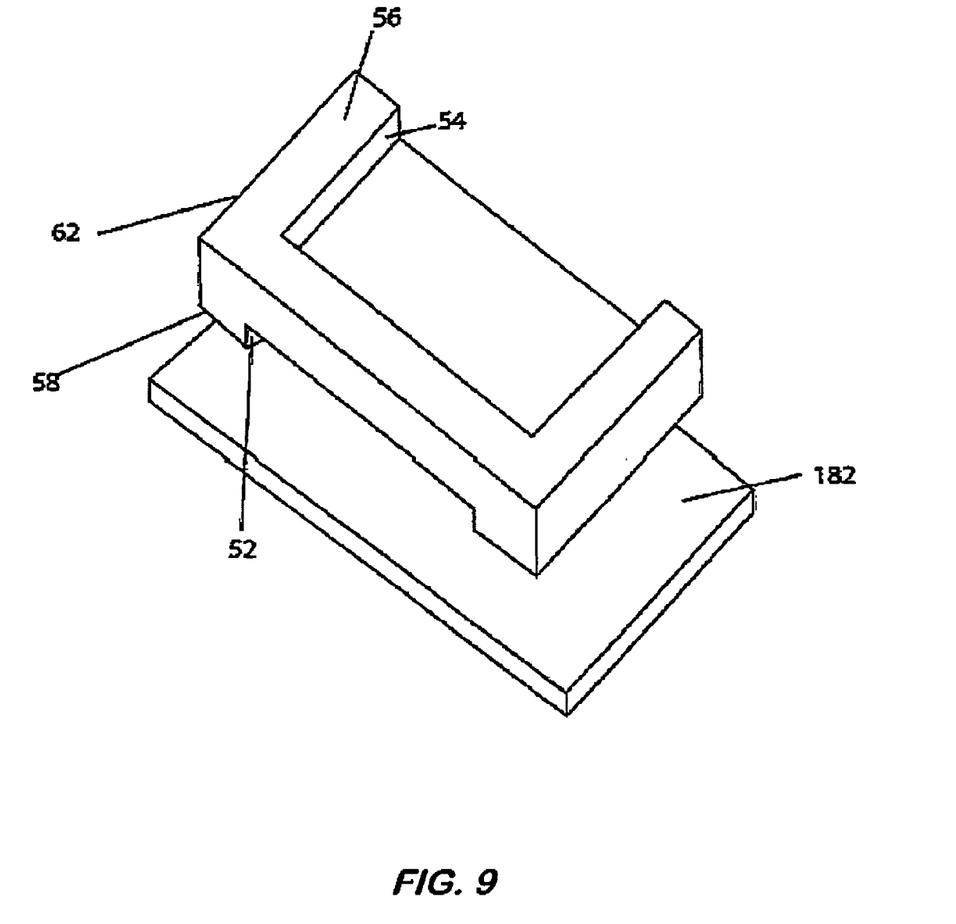
FIG. 9 depicts a view of another intermediate assembly made by the method.

FIG. 9 shows an intermediate assembly with one frame (62) that serves as a process layer (48) and as perimeter barriers (56 and 58) with low aspect ratio cavities (52 and 54). The intermediate assembly of this embodiment is completed by joining the frame (62) to a second process layer (182).

Figure 8:
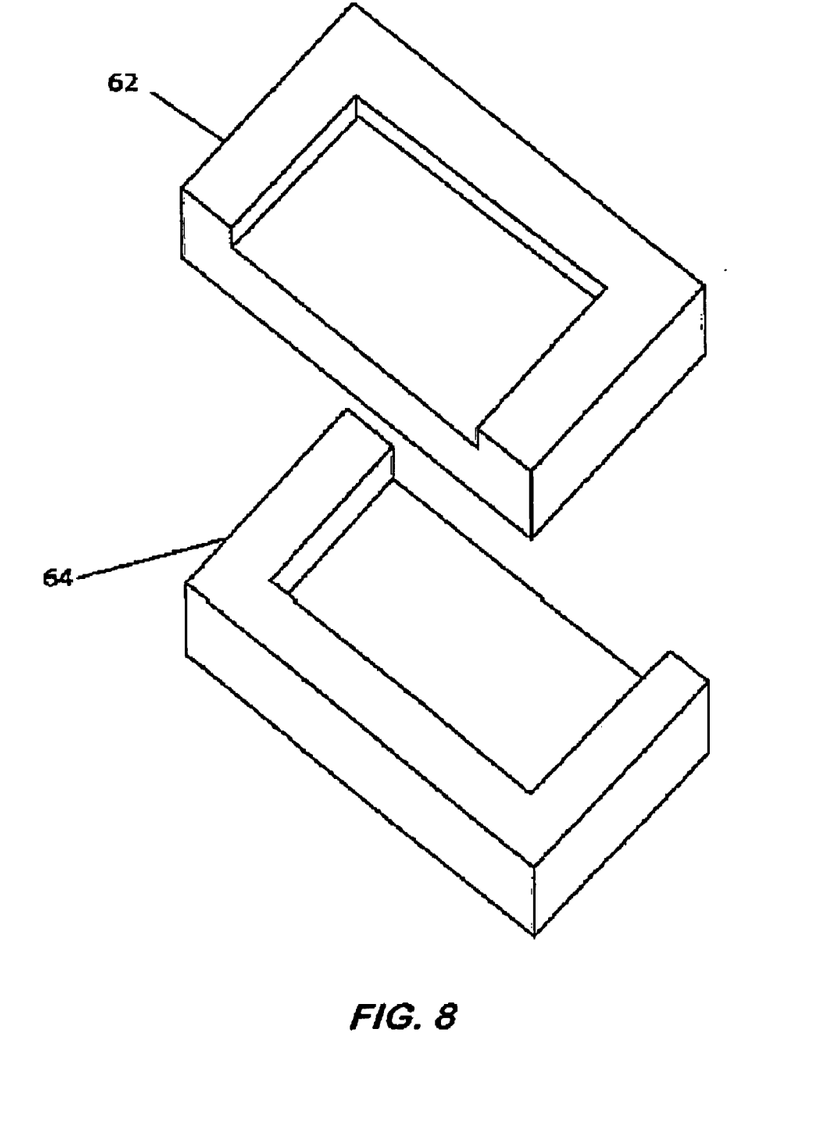
FIG. 8 depicts a view of another intermediate assembly made by the method.

Returning to FIG. 8 this FIG. depicts a view of a stacked intermediate assembly constructed from two frames (62 and 64). Each frame serves as a process layer and as a perimeter barrier and contains a low aspect ratio cavity. The two process layers can have different functions in this embodiment, for example the first process layer can serve to be electrically conductive and the second process layer can serve to be electrically insulating. When used as a fuel cell, at least one frame is preferably made ionically conductive by either forming the frame from an ionic conductor or rendering a portion of a non-conducting frame ionically conductive.

FIG. 9 is a perspective view of an intermediate assembly according to the method wherein the assembly has one frame and two low aspect ratio cavities. In particular, the frame (62) has a front low aspect ratio cavity (52) and a back low aspect ratio cavity (54). The cavities are surrounded by integral perimeter barriers (56 and 58). The intermediate assembly is completed by joining the frame (62) to a second process layer (182).

Figure 10:
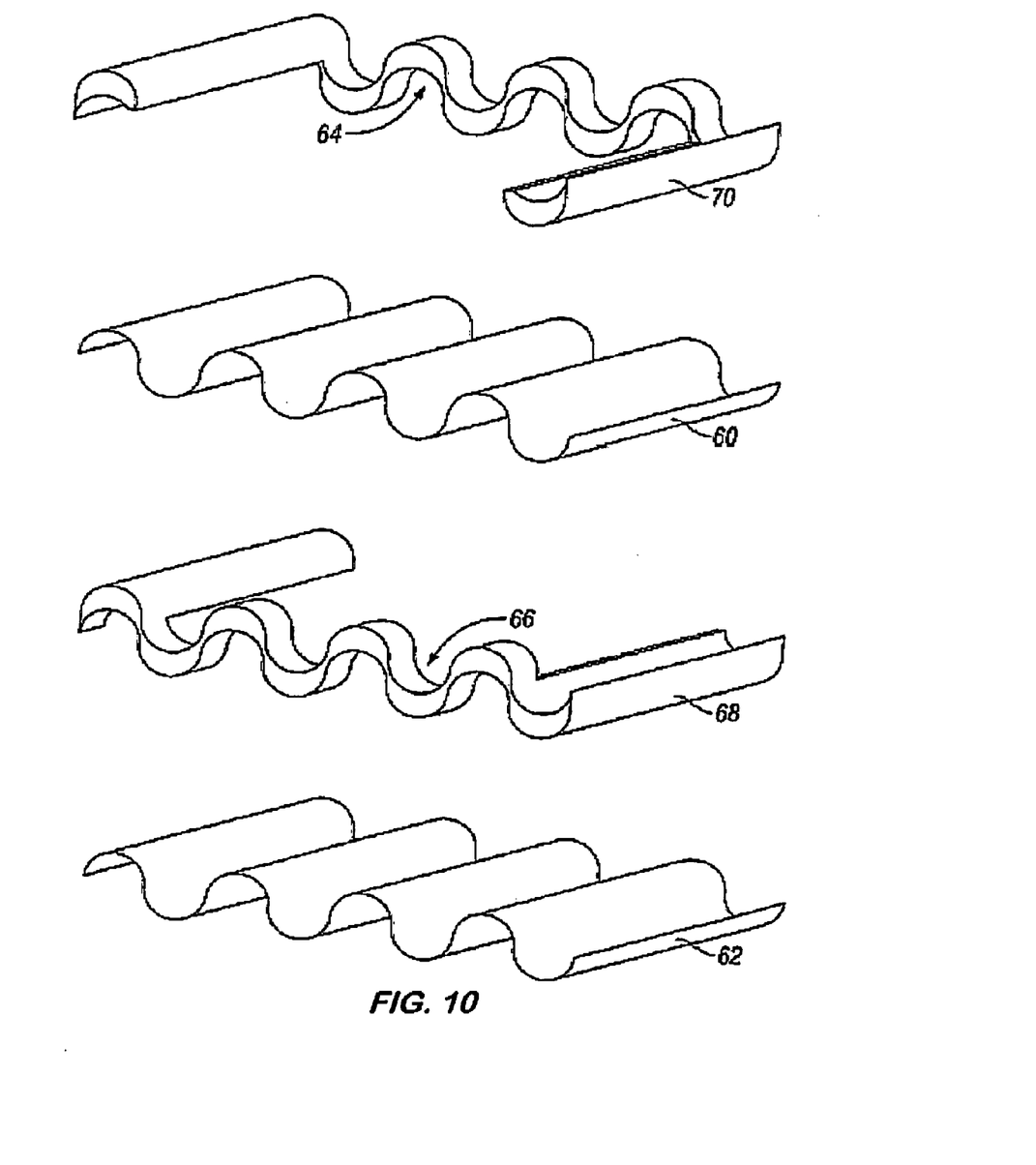
FIG. 10 depicts an exploded perspective view of a reactor frame with undulating process layers.

FIG. 10 shows a unit reactor with undulating process layers (60 and 62). The surface area of the process layer is increased with the undulating construction, thereby increasing the reaction capacity of the compact chemical reactor.

Undulating in the context of this application refers to non-planar process layers, such as layers which are sinusoidal in shape, or arcs, or irregular in some other manner. It is contemplated that some of the process layers can be undulating while remaining process layers can be planar and still form a usable compact chemical reactor.

The compact chemical reactor can be a fuel cell layer formed from multiple intermediate assemblies, which combine together to form unit fuel cells in the overall fuel cell layer.

The invention includes a method making a fuel cell layer with high aspect ratio gas diffusion electrodes, comprising at least one of the following steps:
a. forming at least one intermediate assembly, consisting of:
   i. at least one frame comprising: a process layer, a perimeter barrier and at least one low aspect ratio cavity wherein the low aspect ratio cavity is partially filled with gas diffusion electrode material;
   ii. at least one frame comprising: a process layer, two perimeter barriers, and at least two low aspect ratio cavities disposed on a second process layer wherein the cavities are partially filled with gas diffusion electrode material;
   iii. at least one layer comprising a perimeter barrier formed on one side of a process layer with at least one low aspect ratio cavity wherein the low aspect ratio cavity is partially filled with gas diffusion electrode material; or
   iv. combinations of (i) and (iii);
b. joining at least two intermediate assemblies to together to create a fuel cell layer with at least one high aspect ratio gas diffusion electrodes; and
c. joining the compact chemical reactor with high aspect ratio cavity to a fuel plenum and an oxidant plenum to transport fuel and oxidant into the gas diffusion electrodes.

The method contemplates that the gas diffusion electrode material comprises a porous media, a catalyst layer an electrical conductor, a hydrophobic polymeric binder, and combinations thereof.

The method for making the fuel cell has as an embodiment using frame material comprising an electrolyte, an ion exchange membrane, electrical conductors, a filled metal composite, a filled micro-structure of polymer, a filled epoxy composite, a graphite composite, or combinations thereof.

The method for making a fuel cell uses as the process layer: an electrolyte, an ion exchange membrane, a proton exchange membrane, an electrical conductor, a micro-structure of a polymer, a filled micro-structure of a polymer, a filled epoxy composite, a filled graphite composite, a filled metal composite, a plastic, and combinations thereof. Additionally, to make the fuel cell, the method uses as the perimeter barrier a metal, a silicone, a rubber, a polyamide, a synthetic rubber, an epoxy, polytetrafluroethylene, polyvinyldiflouride, an ion exchange material, a proton exchange material, a composite thereof, a laminate thereof, an alloys blend thereof, and combinations thereof.

The method described herein includes steps for making a fuel cell layer with unit cells having high aspect ratio cavities into which reactants must be transported to reach the fuel cell anodes and cathodes. The method of making the high aspect ratio unit fuel cells of which the layer is composed involves first making and then assembling a number of intermediate assemblies that have low aspect ratio cavities. The initial step entails creating two or more low aspect ratio process layers with a first side and a second side. Each low aspect ratio process layer is formed by depositing precursor materials on a substrate and forming a precursor material into a shape. When the filled low aspect ratio intermediate assemblies, made using frames, are assembled the low aspect ratio cavities are substantially closed off resulting in the creation of high aspect ratio cavities.

The types of precursor materials usable with the method for the fuel cell include electrolytes, ion exchange media such as an ion exchange membrane, liquid electrolytes in suspensions, proton exchange membranes, ceramic membranes, electrolyte filled composites, microstructures of polymers filled with electrolytes, metals, conductive polymers, metal coated polymers.

Each unit reactor can be made of one or more reactor frames. The frames can be made of one material, so that the frames can function as both a perimeter barrier and as a process material.

The frames that are made from a single material can be made by stamping, embossing, ablating, machining, molding, casting, water jet cutting, or otherwise gouging, or chemically etching. Typical materials are stainless steel; Nafion™, a composite, a metal filled composite, electrolyte filled composites, or combinations of these.

The frames can selectively be made porous and used in conjunction with the reactors.

Preferably, the frames are the same dimension as the components of the unit reactor which they replace.

The frames are typically one piece structures to advantageously reduce the number of parts.

Frames can be made out of electrolyte by molding or stamping a block of electrolyte into the desired shape. Frames can be made out of a non conductive material made to have an electrolyte function by being made proton conducting in a specific region. Frames made of metal can provide separation of portions of a cell. Frames made of non-conductive material and then formed to have conductive paths can provide separator functions from each other.

The formed front and back cavities in the frames allow the reactants to move from the plenums to the process layers. In a preferred embodiment, the only transport mechanism for the movement of reactants within the cavities is by diffusion. In an alternative embodiment, the diffusion can be aided by other transport mechanisms including convection and forced flow. The cavities can be filled with material or structured to aid in the distribution of reactants to the process layers. One or more of the cavities can be filled partially, or completely filled, with a material to aid in the transport of reactant, by-product of the reaction caused by the reactants, or transport of attributes of the reactant. The cavity can be filled with a catalyst to promote the function of the compact chemical reactor. A porous media, such as those available from Angstrom Power Inc. of Vancouver, Canada can be used to partially or completely fill the cavities. In a preferred embodiment, the cavity is filled 100% with the porous media. The cavity can be filled with as little as 5% the porous media.

The substrate on which the precursor materials for the fuel cell are deposited can be a release layer, such as nylon, polyethylene, or polytetrafluroethylene. The substrate can also be one of the process layers. The substrate can be a unit reactor, a portion of a unit reactor, or a fuel cell.

The frames for the fuel cell can be created by forming a material into a shape. The material is formed by ablating, etchings, tamping, printing, milling, die cutting, molding, casting, or water jetting. The material can be formed in numerous shapes including a rectangle, a square, a cylinder, a triangle, an octagon, a pentagon, or irregular shapes.

The process layers are thin sheets with each process layer having, preferably, a thickness between one nanometer and two centimeters. As an alternative, the one or more of the process layers can have a thickness different from another process layer. Different process layers can perform different processes within the unit reactor. Each process layer can be made of a filled metal composite, a filled microstructure of polymer, filled epoxy composite, graphite composite, or combinations thereof.

The method continues by creating a plurality of low aspect ratio perimeter barriers by forming a barrier material into a barrier shape. In an alternative method, the low aspect ratio perimeter barriers are formed by depositing barrier precursor materials on a substrate.

The barriers ensure that reactant from one reactant plenum does not migrate into another reactant plenum. The barriers keep the reactant from migrating by the material or the form of the perimeter barriers. Usable materials for the barriers include metal, silicone, rubber, nylon, synthetic rubber, epoxy, polytetrafluroethylene, polyvinyl fluoride, proton exchange membrane material, composites thereof, laminates thereof, alloys thereof, and blends of these materials. Usable shapes for the barriers include microstructures or three-dimensional structures that create a tortuous path for the reactant. In some cases, the barriers can employ both the use of materials and form to prevent the migration of the reactant to another reactant plenum.

Low aspect ratio cavities are created by joining a low aspect ratio perimeter barrier to the first side of at least one of the process layers. The preferred low aspect ratio is a ratio of length to width giater greater than one. Joining the barrier to the process layer can be performed by welding, adhering, clamping, screwing, or otherwise engaging the perimeter barrier to the process layer.

High aspect ratio cavities are created by joining the second side of the process layer to the low aspect ratio cavities. The preferred high ratio is a ratio of length to width less than one.

A catalyst is then introduced on at least one side of each cavity formed in the assemblage to form at least two electrodes.

The cavities can be filled or partially with a fuel or oxidant to transport of protons through the fuel cell layer. The transport process moves an attribute of the reactant from one of the reactant plenums to the other reactant plenum. Attributes within the scope of this application include heat, moisture content, pressure, density, electrical charge, and other similar physical characteristics. The cavities can be filled by forming a micro-structure in the low aspect ratio cavities or by filling with a porous media and a catalyst layer.

The embodiments have been described in detail with particular reference to certain preferred embodiments thereof, but it will be understood that variations and modifications can be effected within the scope of the embodiments, especially to those skilled in the art.

What is claimed is:

1. A method of making a compact chemical reactor with high aspect ratio cavities comprising the steps of:
   a. forming at least two intermediate assemblies, wherein components are chosen from:
      i. at least one frame comprising: a process layer, a perimeter barrier and at least one low aspect ratio cavity; or
      ii. at least one frame comprising: a process layer, two perimeter barriers, and at least two low aspect ratio cavities disposed on either side of the process layer, or iii at least one layer comprising a perimeter hater fanned on one side of a process layer with at least one low aspect ratio cavity; or iv. combinations of (i) and (iii) joined together;

wherein each low aspect ratio cavity is substantially surrounded by the perimeter barrier thereby leaving an opening on a side;

b. joining together at least two intermediate assemblies together each with the low aspect ratio cavity such that the opening of the intermediate assembly is located opposite the opening of an adjacent intermediate assembly to create a unit reactor with at least one high aspect ratio cavity of greater than 1cm/cm; and c. joining the unit reactors by interleaving a first group of unit reactors with a second group of unit reactors to form a compact chemical reactor, wherein the first group on of unit reactors have high aspect ratio cavities in communication with a first reactant plenum through the openings of the first group of unit reactors, and wherein the second group of unit reactors have high aspect ratio cavities in communication with a second reactant plenum through the openings of the second group of unit reactors, thereby enabling a transport process between the reactant plenums and the process layers in the compact chemical reactor formed.

2. The method of claim 1, wherein the frames are formed from a frame material by a method comprising: molding, casting, stamping, printing, ablating, etching, machining, water jetting, forging, and combinations thereof.

3. The method of claim 2, wherein the frame material is selected from the group consisting of: an electrolyte, an ion exchange membrane a filtration membrane, a separation membrane, a micro-structured diffusion mixer, a heater, a catalyst, electrical conductors, thermal conductors, a filled metal composite, a filled micro-structure of polymer, a filled epoxy composite, a graphite composite, and combinations thereof.

4. The method of claim 1, wherein the step of forming the intermediate assembly comprises making a structural form that prevents reactant from one reactant plenum from moving into the other reactant plenum.

5. The method of claim 4, wherein the structural form is a micro-structure or a three dimensional structure with a tortuous path.

6. The method of claim 1, wherein the step of forming the perimeter barrier comprises forming a barrier from barrier material and then joining the formed barrier material to at least a portion of at least one of the process layers.

7. The method of claim 1, wherein the step of farming the intermediate assembly further comprises creating process layers with a defined shape selected from the group consisting of: a rectangle, a square, a triangle, an annular ring, an arc, and an arbitrary pattern.

8. The method of claim 1, further comprising the step of at least partially filling at least a portion of one of the low aspect ratio cavities with a material to facilitate the transport of reactant material or transport of reactant attributes.

9. The method of claim 8, wherein the material used to fill the low aspect ratio cavity forms a micro-structure.

10. The method of claim 8, wherein the material used to fill one of the low aspect ratio cavities is selected from the group consisting of: a catalyst, a porous material, an electrical conductor, a hydrophobic polymeric binder, and combinations thereof.

11. The method of claim 1, wherein each process layer is selected from the group consisting of: an electrolyte, an ion exchange membrane, a proton exchange membrane, a filtration membrane, a separation membrane, a micro-structure diffusion mixer, a heater, a catalyst, an electrical conductor, a thermal conductor, a micro-structure of a polymer, a filled micro-structure of a polymer, a filled epoxy composite, a filled graphite composite, a filled metal composite, a plastic, and combinations thereof.

12. The method of claim 1, wherein the perimeter barrier is selected from the group consisting of: a metal, a silicone, a rubber, a polyamide, a synthetic rubber, an epoxy, polytetrafluroethylene, polyvinyldiflouride, an ion exchange material, a proton exchange material, a composite thereof, a laminate thereof, an alloys blend thereof, and combinations thereof.

13. The method of claim 1, wherein the step of joining intermediate assemblies comprises joining between 2 and 100,000 intermediate assemblies to form the compact chemical reactor.

14. The method of claim 1, wherein the perimeter barrier is formed on the process layer by: welding, adhering, clamping, screwing, or otherwise engaging the perimeter baffler to the process layer.

15. The method of claim 1, wherein the step of forming the intermediate assembly comprises making at least one of the process layers an undulating process layer.

16. The method of claim 1, wherein the step of forming the intermediate assembly comprises making at least one of the process layers an undulating process layer.

17. A method making a fuel cell layer with frames and high aspect ratio gas diffusion electrodes, comprising the steps of:

a. forming at least two intermediate assemblies, wherein components are chosen from:

at least one frame comprising: a process layer, a perimeter barrier and at least one low aspect ratio cavity wherein the low aspect ratio cavity is partially filled with an electrically conductive gas diffusion material;

ii at least one frame comprising a process layer, two perimeter barriers, and at least two low aspect ratio cavities disposed on a either side of the process layer wherein the cavities are partially filled with an electrically conductive gas diffusion material;

iii. at least one layer comprising a perimeter barrier formed on one side of a process layer with at least one low aspect ratio cavity wherein tire low aspect ratio cavity is partially filled with an electrically conductive gas diffusion material; or iv. combinations of (i) and (iii);

wherein each low aspect ratio cavity is substantially surrounded by the perimeter barrier, thereby leaving an opening on a side;

b. joining together at least two intermediate assemblies each with the low aspect ratio cavity such that the opening of the intermediate assembly is located opposite the opening of an adjacent intermediate assembly to create a unit fuel cell layer with at least one high aspect ratio cavity of treater than 1cm/am and c. joining the unit fuel cell by interleaving a first group of unit fuel cells with a second group of unit fuel cells to form a fuel cell layer. wherein the first group of unit fuel cells have high aspect ratio cavities in communication with a fuel plenum through the openings of the first group of unit fuel cells, and the second group of unit fuel cells have high aspect ratio cavities in communication with an oxidant plenum through the openings of the second group of unit reactors, enabling transport of fuel and oxidant into the electrically conductive gas diffusion material.

18. The method of claim 17, wherein the electrically conductive gas diffusion material is selected from the group consisting of: a porous media, a catalyst layer, an electrical conductor, a hydrophobic polymeric binder, and combinations thereof.

19. The method of claim 17, wherein the frame comprises a frame material formed by a member selected from a group consisting of: molding, casting, stamping, etching, printing, ablating, machining, water jetting, forging, and combinations thereof.

20. The method of claim 19, wherein the frame material is selected from the group consisting of: an elctrolyte, an ion exchange membrane, electrical conductors, a filled metal composite, a filled micro-structure of polymer, a filled epoxy composite, a graphite composite, or and combinations thereof.

21. The method of claim 17, wherein the step of forming the intermediate assembly comprises making a structural form that prevents the uncontrolled mixing oxidant and fuel.

22. The method of claim 21, wherein the structural form comprises a micro-structure or a three dimensional structure with a undulating path.

23. The method of claim 17, wherein the step of forming the perimeter barrier comprises forming a barrier from barrier material and then joining the formed barrier to at least a portion of at least one of the process layers.

24. The method of claim 17, wherein the step of forming the intermediate assembly further comprises creating process layers with a defined shape selected from the group consisting of: a rectangle, a square, a triangle, an annular ring, an arc, and an arbitrary pattern.

25. The method of claim 17, wherein the process layer is selected from the group consisting of: an electrolyte, an ion exchange membrane, a proton exchange membrane, an electrical conductor, a micro-structure of a polymer, a filled micro-structure of a polymer, a filled epoxy composite, a filled graphite composite, a filled metal composite, a plastic, and combinations thereof.

26. The method of claim 17, wherein the perimeter barrier is selected from the group consisting of: a metal, a silicone, a rubber, a polyamide, a synthetic rubber, an epoxy, polytetrafluroethylene, polyvinyldiflouride, an ion exchange material, a proton exchange material, a composite thereof, a laminate thereof, an alloy thereof, and combinations thereof.

27. The method of claim 17, wherein the cavity has a high aspect ratio greater than 1 cm/cm.

28. The method of claim 17, wherein the cavity has a low aspect ratio less than 1 cm/cm.

29. The method of claim 17, wherein the step of joining the intermediate assemblies comprises joining between 2 and 100,000 intermediate assemblies to form the fuel cell layer.

* * * * *

UNITED STATES PATENT AND TRADEMARK OFFICE
CERTIFICATE OF CORRECTION

| | |
|---|---|
| PATENT NO. | : 7,195,652 B2 |
| APPLICATION NO. | : 10/818612 |
| DATED | : March 27, 2007 |
| INVENTOR(S) | : McLean et al. |

It is certified that error appears in the above-identified patent and that said Letters Patent is hereby corrected as shown below:

On the title

On page 2, in Item (56), under "Foreign Patent Documents", in column 2, line 2, below "EP 0 823 743 7/1997" delete "EP 0823743 8/1997".

In column 1, line 35, delete "reactors" and insert -- reactor --, therefor.

In column 1, line 57, after "different" delete "than".

In column 5, line 13, delete "of(53)" and insert -- of (53) --, therefor.

In column 5, line 34, delete "place" and insert -- placed --, therefor.

In column 5, line 35, after "reactor" insert -- , --.

In column 5, line 51, delete "Coming" and insert -- Corning --, therefor.

In column 5, line 56, after "Edegem" insert -- , --.

In column 7, lines 21–26, delete "Alternatively, the frame material............. can each have a different material." and insert the same on Col. 7, Line 20 after "Nafion$^{TM}$." as a continuation of the same paragraph.

In column 7, line 23, delete "filed" and insert -- filled --, therefor.

In column 8, line 53, after "barrier" insert -- ; --.

In column 10, line 31, after "width" delete "giater".

In column 11, lines 1–2, in Claim 1, delete "hater fanned" and insert -- barrier formed --, therefor.

In column 11, line 17, in Claim 1, after "group" delete "on".

In column 11, line 32, in Claim 3, after "exchange membrane" insert -- , --.

In column 11, line 49, in Claim 7, delete "farming" and insert -- forming --, therefor.

In column 12, line 21, in Claim 14, delete "baffler" and insert -- barrier --, therefor.

UNITED STATES PATENT AND TRADEMARK OFFICE
CERTIFICATE OF CORRECTION

PATENT NO. : 7,195,652 B2
APPLICATION NO. : 10/818612
DATED : March 27, 2007
INVENTOR(S) : McLean et al.

It is certified that error appears in the above-identified patent and that said Letters Patent is hereby corrected as shown below:

In column 12, line 33, in Claim 17, before "at least" insert -- i. --.

In column 12, line 38, in Claim 17, after "ii" insert -- . --.

In column 12, line 38, in Claim 17, after "comprising" insert -- : --.

In column 12, line 40, in Claim 17, after "on" delete "a".

In column 12, line 46, in Claim 17, delete "tire" and insert -- the --, therefor.

In column 12, line 58, in Claim 17, delete "treater" and insert -- greater --, therefor.

In column 12, line 58, in Claim 17, delete "cm/am" and insert -- cm/cm --, therefor.

In column 12, line 59, in Claim 17, delete "cell" and insert -- cells --, therefor.

In column 12, line 61, in Claim 17, after "layer" delete "." and insert -- , --, therefor.

In column 13, line 9, in Claim 19, after "from" delete "a" and insert -- the --, therefor.

In column 13, line 14, in Claim 20, delete "elctrolyte" and insert --electrolyte --, therefor.

Signed and Sealed this

Twenty-second Day of May, 2007

JON W. DUDAS
*Director of the United States Patent and Trademark Office*